United States Patent [19]

Possanza et al.

[11] Patent Number: 5,776,515
[45] Date of Patent: Jul. 7, 1998

[54] DEVICE FOR PRODUCING DISCRETE ROLLS OF CHILLED SOLUTIONS OR DISPERSIONS

[75] Inventors: Steven D. Possanza, Penfield; Daniel J. Wooster, Ontario, both of N.Y.; Kenneth A. Nicolai, Fort Collins, Colo.; Paul K. Kelly, Webster, N.Y.

[73] Assignee: Eastman Kodak Company, Rochester, N.Y.

[21] Appl. No.: 602,189

[22] Filed: Feb. 16, 1996

Related U.S. Application Data

[60] Provisional application No. 60/003,280 Aug. 10, 1995.

[51] Int. Cl.[6] .................... B29C 41/26; B29C 41/36
[52] U.S. Cl. .................... 425/147; 425/223; 425/447
[58] Field of Search .................... 425/147, 169, 425/223, 224, 447, 471

[56] References Cited

U.S. PATENT DOCUMENTS

| | | | |
|---|---|---|---|
| 1,130,670 | 3/1915 | Christensen | 425/223 |
| 1,310,311 | 7/1919 | Travis | 425/223 |
| 1,504,183 | 8/1924 | Conger et al. | 425/223 |
| 1,576,137 | 3/1926 | Johnson . | |
| 2,123,596 | 7/1938 | Doering | 62/346 |
| 2,292,760 | 8/1942 | Kath | 425/223 |
| 2,439,802 | 4/1948 | Francis, Jr. | 425/223 |
| 2,688,771 | 9/1954 | Jandacek | 425/223 |
| 3,147,173 | 9/1964 | Eolkin et al. | 425/223 |
| 3,936,549 | 2/1976 | Kohler et al. | 427/428 |
| 3,947,168 | 3/1976 | Ujihara et al. | 425/223 |
| 4,098,095 | 7/1978 | Roth | 425/223 |
| 4,421,709 | 12/1983 | Steinberg | 425/223 |
| 5,391,071 | 2/1995 | Hazarie et al. | 425/224 |

Primary Examiner—James P. Mackey
Attorney, Agent, or Firm—Arthur H. Rosenstein

[57] ABSTRACT

A device for producing discrete rolls of chilled solutions or dispersions wherein the combination of a distribution bar, an auxiliary weir hopper and a puddle hopper allows for continuous coating of a rotating chiller drum in producing discrete rolls separated from each other by a time gap built into the deposition of the solutions or dispersions from the hopper to the rotating chilled drum.

1 Claim, 4 Drawing Sheets

DEVICE FOR PRODUCING DISCRETE ROLLS OF CHILLED SOLUTIONS OR DISPERSIONS

CROSS REFERENCE TO RELATED APPLICATION

Reference is made to and priority claimed from U.S. Provisional Application Ser. No. 60/003,280, filed 10 Aug. 1995, entitled DEVICE AND PROCESS FOR PRODUCING DISCRETE ROLLS OF CHILLED SOLUTIONS OR DISPERSIONS.

FIELD OF THE INVENTION

The present invention relates to a method and device for intermittently distributing a solution or dispersion to a drum chiller to form roll products in the manufacture of food, plastics, chemicals, paper and the like. More particularly, the invention relates to a method and device for processing emulsions, dispersions and gelatin solutions into rolls and sheets, such as used in photography.

BACKGROUND OF THE INVENTION

Drum chillers are well-known in the art, sometimes also referred to as Chilled Rolls or Flakers and are widely used in the food and chemical industries to manufacture food, plastics, chemicals and a variety of other products.

In the food industry the drum chillers are used in the manufacture of cereals, such as corn flakes. Corn mesh is continuously distributed to the drum surface by a pipe. The mesh is distributed across the surface of the drum and is dried. The dried mesh is then flaked off the drum by a doctor blade in the form of small, rigid corn flakes that are easy to handle and package. Packaged cheese slices are also produced on drum chilling equipment. Molten cheese is continuously pumped to the drum surface and thinned out between the drum and an auxiliary roller to form an approximately 1/16 inch thick sheet. The sheet of cheese is chilled, then peeled from the drum surface by a doctor blade. After peeling, the sheet is passed through chopping and slitting equipment to form square cheese slices which are then packaged.

In the chemical industry, molten plastic is chilled on the drum then flaked similarly to that of cereal in the food industry, or the molten plastic is chilled on the drum to produce continuous sheets of plastic for later coating or other applications.

U.S. Pat. Nos. 1,576,137; 2,123,596 and 3,936,549 pertain to steps, parts, constructions, arrangements and combinations for coating moving surfaces on a drum chiller and separating the so-produced material by a scraper blade.

In the processing of emulsions, dispersions and gelatin solutions for the production of rolls and sheets used in photography, we have found the above-referred to devices and methods less than satisfactory. Our experiments with photographic gelatin solutions showed that although it is possible to produce flaked products by chilling the coating on the drum similarly to that of food and plastic flakes, the so-produced flaked product lacked enough rigidity and proved impossible to handle without excessive waste. Also, when the gelatin solution was chilled on the drum to form a sheet and peeled from the drum surface by a doctor blade, the chilled product did not exhibit sufficient strength to maintain sheet integrity as it passed through the chopping equipment. When continuous sheets were produced, they could not be handled conveniently and packaged for later use.

It is a principal object of the present invention to provide a method and a device for producing discrete rolls of chilled material that can be easily handled in the feeding, packaging, storage and melting processes.

Other objects of the present invention include the production of uniform rolls, the provision of a continuous automatic process to produce the rolls, and minimization of waste during the process.

SUMMARY OF THE INVENTION

These objectives are accomplished by a device comprising:

supply means to deposit an amount of a solution or dispersion or dispersion onto the external surface of a continuously rotating drum chiller to form a solid coating thereon by the action of a refrigerating medium, said amount of solution or dispersion being sufficient to form one chilled roll of coating;

means for removing said coating from the external surface of the drum chiller to form said coating into a roll; and means for having a time gap before the next roll formation begins so that the rolls are separated.

These and other objectives are accomplished by a method comprising the steps of:

depositing an amount of a solution or dispersion onto the external surface of a continuously rotating drum chiller to form a solid coating thereon by the action of a refrigerating medium, said amount of solution or dispersion being sufficient to form one chilled roll of coating;

continuously removing said coating from the external surface of the drum chiller to form said coating into a roll;

providing means for having a time gap before the next roll formation begins so that the rolls are separated.

In the preferred embodiment of the present invention, we have discovered that uniform, discrete rolls of solid material may be formed from a continuous-feed of a solution or dispersion in the form of an emulsion, dispersion or gelatin solution, said solution having a viscosity of at least 25 cp at a flow rate of from about 20 to about 100 kg/min, said discrete rolls of said solid material being produced on a device which comprises:

(a) a supply pump which receives said solution or dispersion from a supply vessel;

(b) an auxiliary weir hopper having a top edge;

(c) a level sensor located in the bottom of said weir hopper designed to measure the volume of said solution or dispersion delivered into said auxiliary weir hopper from a distribution bar;

(d) means to tip said auxiliary weir hopper 90 degrees relative to its horizontal position to empty a predetermined volume of solution or dispersion from said weir hopper into a puddle hopper;

(e) a distribution bar located flush with the top edge of the auxiliary weir hopper said distribution bar comprising:
a tubing having open ends to receive said solution or dispersion through said open ends thereof
from said supply pump and having a slot at the top of a bar to allow distribution of said solution or dispersion into said auxiliary weir hopper;

(f) a rotating drum chiller to receive and cool the solution or dispersion into a solid material delivered onto its surface from a puddle hopper;

(g) a puddle hopper located at about 290 degrees from the top of said drum chiller and spaced therefrom and also spaced below said auxiliary weir hopper to receive the solution or dispersion from said auxiliary weir hopper; and (h) a doctor blade located between 290–300 degrees from the top of said drum chiller and in slight contact therewith, said doctor blade having an angle of from about 90 to about 115 degrees to the tangent of the drum surface and is designed to remove said solid material from said drum chiller and to form said solid material into a roll.

In the preferred embodiment of the present invention we have discovered a method of producing discrete rolls of solid material formed from a continuous feed of a solution or dispersion in the form of an emulsion, dispersion or gelatin solution, said solution having a viscosity of at least about 25 cp at a flow rate of from about 20 to about 100 kg/min comprises the steps of:

(a) delivering said solution or dispersion continuously to an auxiliary weir hopper located above a puddle hopper;

(b) filling said auxiliary weir hopper to a predetermined level with said solution or dispersion equivalent to one roll diameter of product;

(c) dumping said solution or dispersion from the auxiliary weir hopper into the puddle hopper;

(d) depositing said solution or dispersion from said puddle hopper onto a drum chiller to form a coating thereon equivalent to one chilled roll, said drum chiller being rotated continuously;

(e) removing said coating from said drum chiller by a doctor blade and forming said coating into a roll; and (f) introducing a gap before the next cycle of roll formation by allowing time for the filling of said auxiliary hopper with said solution or dispersion to a predetermined volume before said solution or dispersion from said auxiliary hopper is dumped into said puddle hopper.

DETAILED DESCRIPTION OF THE INVENTION

Figure 1:
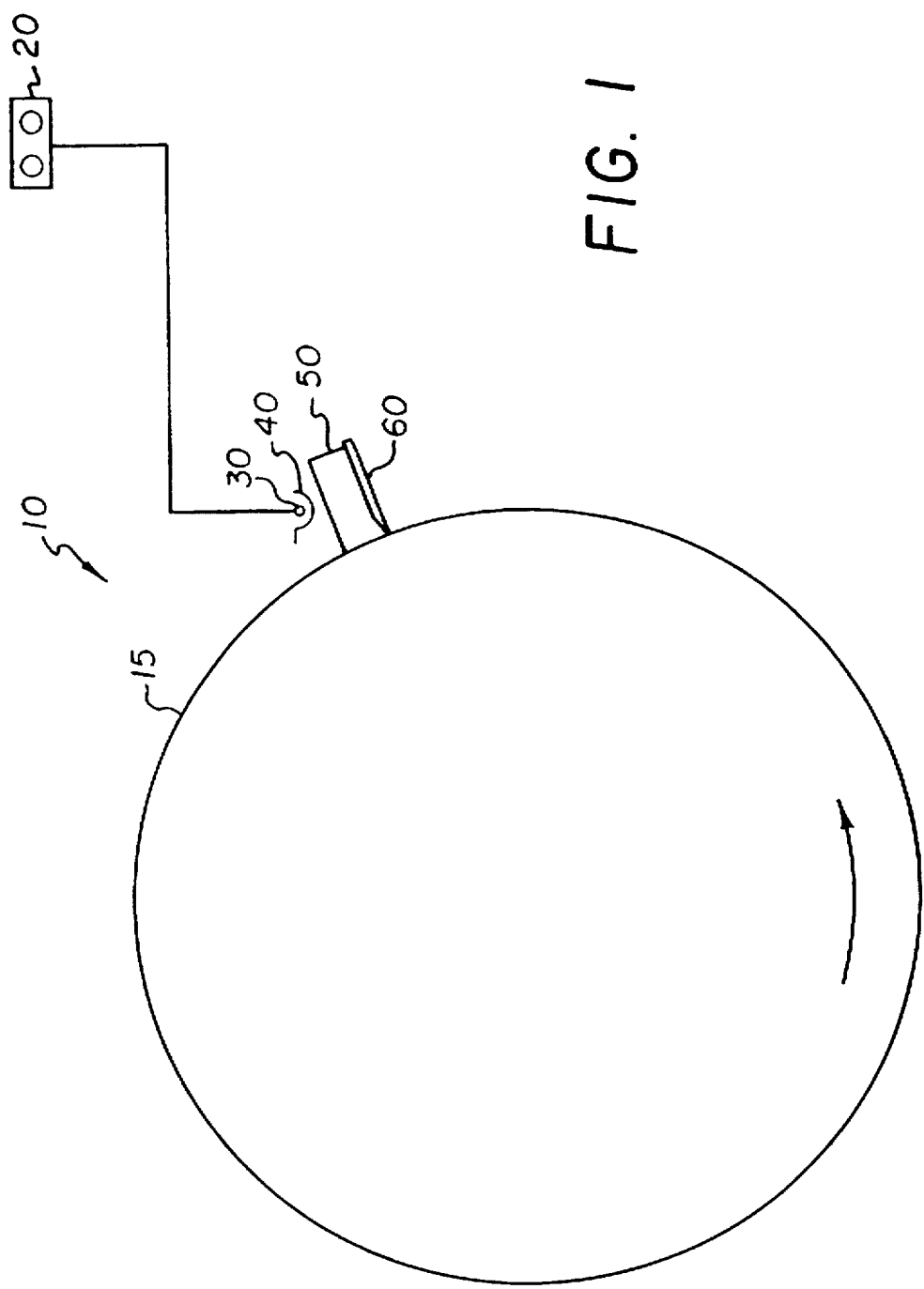
FIG. 1 is a side schematic view of the drum chiller, distribution bar, weir hopper, puddle hopper, doctor blade and supply pump assembly.
Figure 2:
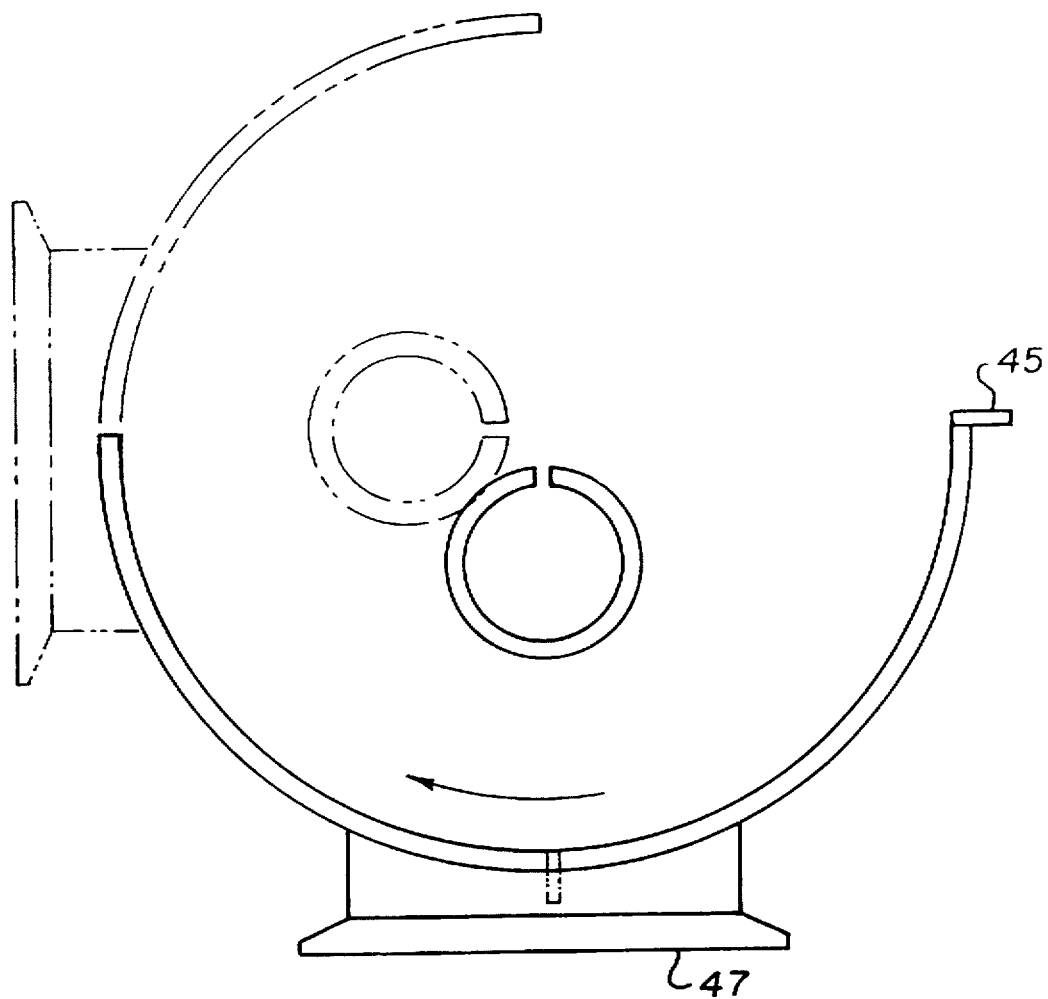
FIG. 2 is a side schematic view of the weir hopper, distribution bar, lip located on the end of the weir hopper pipe, and sensor fitting.
Figure 3:
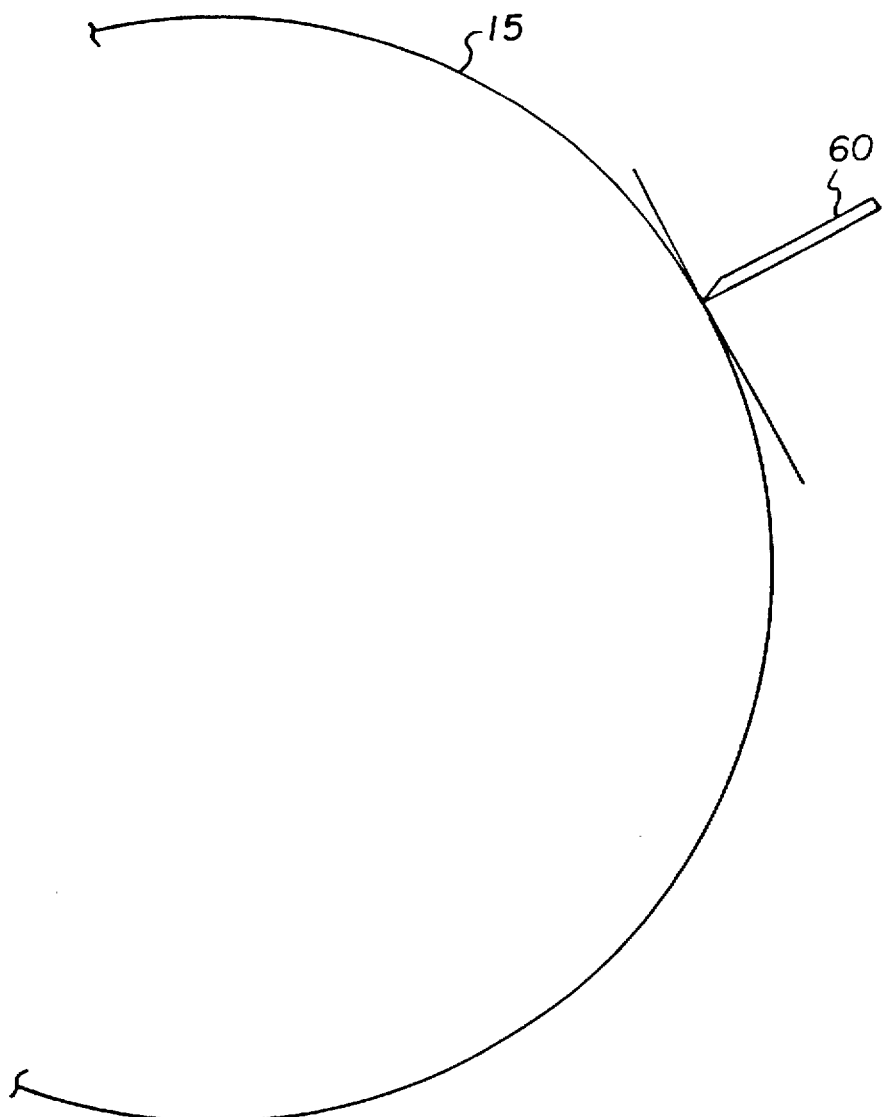
FIG. 3 is a side schematic view of the drum chiller and doctor blade showing optimum doctor blade angle.
Figure 4:
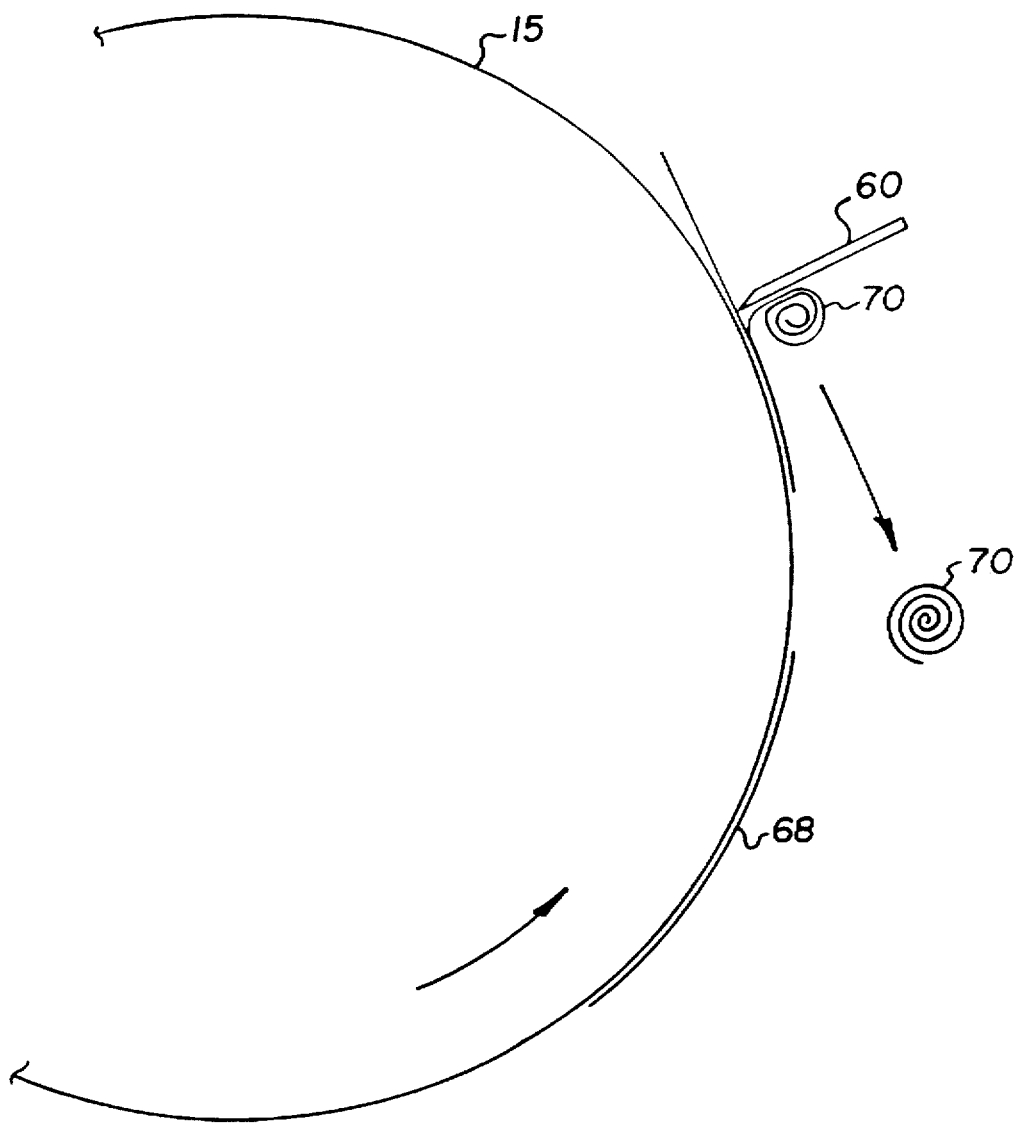
FIG. 4 is a side schematic view of the chilled product/roll formation.

Referring to FIGS. 1 and 2, which schematically illustrate the major components of the assembly used in the practice of the present invention, the assembly 10 comprises:

a supply pump 20;

drum chiller 15;

distribution bar 30;

auxiliary weir hopper 40;

puddle hopper 50; and doctor blade 60.

Spacial orientation and operation of the assembly are as follows. A solution or dispersion is delivered continuously by supply pump 20 from a supply vessel to distribution bar 30 located at the top of weir hopper 40. The distribution bar 30 contains a small slot to provide for uniform distribution of the solution or dispersion across weir hopper 40 over a wide range of flow and viscosity. The solution or dispersion then flows from the slot into weir hopper 40 and is monitored by level sensor 47 located in the bottom of weir hopper 40. When the level of the solution or dispersion reaches a pre-set point, weir hopper 40 tips 90 degrees and dumps the solution or dispersion into puddle hopper 50. When the solution or dispersion is emptied from weir hopper 40, the weir hopper tips back 90 degrees to the fill position and again begins the cycle. The solution or dispersion flow through distribution bar 30 is continuous throughout this process. The solution or dispersion dumped into puddle hopper 50 immediately begins to coat drum chiller 15 which runs continuously. Since the solution or dispersion is uniformly distributed across puddle hopper 50, the starting edge of the chilled product is even. The solution or dispersion continues to coat drum chiller 15 until puddle hopper 50 is emptied. The chilled product ends with an even edge across the chilled product sheet 68. The chilled product 68 travels around the drum chiller and is cooled to the pre-set temperature point. The product is then removed from the drum chiller by rolling up on the doctor blade 60. When the chilled product is completely rolled up in the form of product roll 70, it drops from the doctor blade onto material handling equipment.

A suitable drum chiller commonly used in the food and chemical industries for a variety of applications, such as for example, as a drier to make corn flakes, as a chiller to make plastic flakes and continuous sheets of plastic, is of about 8 feet in diameter, 14 feet wide and has about 326 square feet of cooling capacity. It operates at 1–4 RPM and is cooled with a brine solution of about 32° F. Product inlet temperatures range from about 130° to 95° F. Products produced by the use of the drum chiller are cooled to a final temperature of between 45° to 60° F.

The distribution bar comprises of a one inch tubing having a length of between 4 to 7 feet and is fed from both ends. A slot having about 3/32 inch diameter is cut in the top of the distribution bar to allow even distribution of the solution or dispersion. The top of the bar is located flush with the top edge of the weir hopper. While more than one distribution bar may be used with a particular drum chiller, we prefer to use two or three distribution bars.

The weir hopper is located directly above the puddle hopper having a minimum clearance of about 4 to 8 inches therefrom to allow space for the level sensor, and comprises a half-round pipe, such as a schedule 40 pipe having an outside diameter of about 4.5 inches, and about 4 to 7 feet in length. The openings of the pipe are capped on both ends. A level sensor is located in the middle bottom of the weir hopper and measures level corresponding to the volume of a solution or dispersion, dispersion or suspension introduced into the weir hopper through the distribution bar. The end caps of the weir are mounted to bearings allowing the weir and the distribution bar to be rotated by an actuator which is positioned 90 degrees to dump. It is critical that the weir hopper produces a clean dump into the puddle hopper without any drips that would lead to waste coated into the gaps. To prevent dripping, a lip was added to the dumping edge of the weir hopper consisting of about 1/16 inch thick by 1/4 inch wide piece of metal located parallel to the radius of the weir hopper.

The puddle hopper is located 290 degrees from the top of the drum chiller. Depending on its design it can hold up to about four liters of solution per linear foot of the product.

The doctor blade is located adjacent to the bottom of the puddle hopper and is used to remove the product from the drum chiller and to form rolls of the product. It is necessary to provide the doctor blade with a sharp edge in contact with the drum chiller so that the product can be removed efficiently from the drum chiller. The doctor blade is located between 290 and 300 degrees from the top of the drum with an angle of from about 90 to about 110 degrees to a tangent to the drum surface for processing emulsions and with an angle of from about 105 to about 115 degrees to a tangent to the drum surface for dispersion.

The solution or dispersion is delivered to the distribution bar, and in turn to the weir hopper and puddle hopper by a supply pump, such as a Waukesha lobe pump through a 1.5 inch ID pipe at a rate of between 20 to 100 kg/min.

The process of the present invention is applicable to emulsions, dispersions, and gelatin solutions for producing products for the food and chemical industries. It is important, however, that the viscosity of such emulsions, dispersions and gelatin solutions do not fall below about 25 cp. The use of emulsions, dispersions and gelatin solutions having a viscosity of less than about 25 cp do not produce satisfactory product. It is preferred that the emulsions, dispersions and gelatin solutions have a viscosity of from about 25 to about 500 cp at a flow rate between 20 and 100 kg/min.

Experiments were conducted with the device of the present invention and comparable devices of the prior art along with processes of using the same to produce discrete product rolls.

COMPARATIVE EXAMPLE 1

A puddle hopper and doctor blade were made into one unit and used in a process wherein the puddle hopper was fed continuously with a solution having a viscosity of about 20 cp to produce a chilled coating of product on the drum.

The chilled product rolled up on the doctor blade and broke off under its own weight. Instead of rolls, sheets and strips were primarily produced because the rolls pulled away from the drum surface before they broke off. These forms of product involved high waste and the process was found to be unreliable.

COMPARATIVE EXAMPLE 2

In order to produce discrete and consistent rolls of chilled product, a chopping device was developed to cut the chilled product (referred to in Example 1) across the face of the drum just before the product rolled up on the doctor blade. The method proved complex and inconsistent.

COMPARATIVE EXAMPLE 3

During experiments with the cross cut chopper (referred to in Example 2), it was observed that when the chopper was rotated at a high RPM, it removed a strip of product from the drum surface. If this strip was wide enough, it allowed the rolls to fall off. If the strip was too narrow, the rolls rolled into each other and created the problems previously described.

COMPARATIVE EXAMPLE 4

Orientation of the doctor blade outside at 70 degrees to a tangent to the surface of the drum chiller resulted in poor quality rolls.

Experiments on the drum chiller have shown an optimum doctor blade of 90 degrees between the blade surface and the tangent to the drum surface. Angles below 80 degrees produced cracked and small rolls. Angles about 115 degrees did not produce rolls.

COMPARATIVE EXAMPLE 5

Interval coating development on the pilot drum was successful by actually stopping the pump to produce a gap between rolls. Based on a scale up factor and the pump location above the drum, it was reasoned that it is impractical to try and stop flow to the hopper by turning off the pump. A number of alternative methods were then evaluated.

Pump Bypass: A pressure relief bypass valve was installed in the down line around the product pump. To stop flow, a valve at the drum was closed to dead head the pump and stop flow to the drum. This caused pressure to build up and open the bypass. When the valve was opened to start filling the hopper again, the pressure blew product across the drum. Attempts to reduce the pressure by adjusting the bypass did not produce a significant improvement in the operation.

Divert Flow: The bypass valve was removed from the down line and the pump was allowed to run continuously. A three-way valve located above the hopper was diverted between the hopper and drain to fill the hopper and produce a space between coatings. This method clearly produced discrete rolls, but because product continued to drain from line after the valve the end of the coating was not uniformly distributed and the material did not roll consistently.

COMPARATIVE EXAMPLE 6

Product characteristics (type, viscosity, gelatin concentration) have a major impact on the chillability of products. Pilot experiments have shown that dispersions tend to be more difficult to drum chill than comparable emulsions. The dispersions crack and break apart after chilling. Results have also shown that products below 25 cp (8% gel) do not drum chill well because they are very thin and tend to break up after rolling.

The following products were evaluated:

Gelatin solutions: 22 cp, 50 cp, 500 cp

Emulsions: 9 cp, 76 cp

Dispersion: 80 cp, 485 cp, 109 cp, 100 cp.

Full scale experiments confirmed and showed that dispersions had a tendency to crack or break after chilling and that optimization of conditions was important. Emulsion and gelatin solutions were very robust. Products below 25 cp were very difficult to handle after chilling and are not recommended for the full scale or pilot drum chilling process. Solution or dispersions as high as 500 cp viscosity have been successfully drum chilled.

The invention has been described in detail with particular reference to certain preferred embodiments thereof, but it will be understood that variations and modifications can be effected within the spirit and scope of the invention.

What is claimed is:

1. A device to produce uniform, discrete rolls of solid material from a continuous feed in the form of emulsion, dispersion or gelatin solution comprising:

(a) a supply pump which receives said emulsion, dispersion or gelatin solution from a supply vessel;

(b) an auxiliary weir hopper having a top edge;

(c) a level sensor located in the bottom of said auxiliary weir hopper designed to measure the volume of said emulsion, dispersion or gelatin solution delivered into said auxiliary weir hopper from a distribution bar;

(d) means to tip said auxiliary weir hopper 90 degrees relative to its horizontal position to empty a predetermined volume of emulsion, dispersion or gelatin solution from said weir hopper into a puddle hopper;

(e) said distribution bar located flush with the top edge of the auxiliary weir hopper said distribution bar comprising:

a tubing having open ends to receive said emulsion, dispersion or gelatin solution through said open ends thereof from said supply pump and having a slot at the top of the bar to allow distribution of said emulsion, dispersion or gelatin solution into said auxiliary weir hopper;

(f) a rotating drum chiller to receive and cool the emulsion, dispersion or gelatin solution into a solid material delivered onto its surface from said puddle hopper;

(g) said puddle hopper located at about 290 degrees from the top of said drum chiller measured in the direction of the drum rotation and spaced therefrom and also spaced below said auxiliary weir hopper to receive the emulsion, dispersion or gelatin solution from said auxiliary weir hopper; and (h) a doctor blade located between 290–300 degrees from the top of said drum chiller measured in the direction of the drum rotation and in contact therewith and located below said puddle hopper, said doctor blade having an angle of from about 90 to about 115 degrees to the tangent of the drum surface and is designed to remove said solid material from said drum chiller and to form said solid material into a roll.

* * * * *